Feb. 16, 1960 G. E. LOWITZ 2,925,466
TELEVISION RECEIVER
Filed March 29, 1956
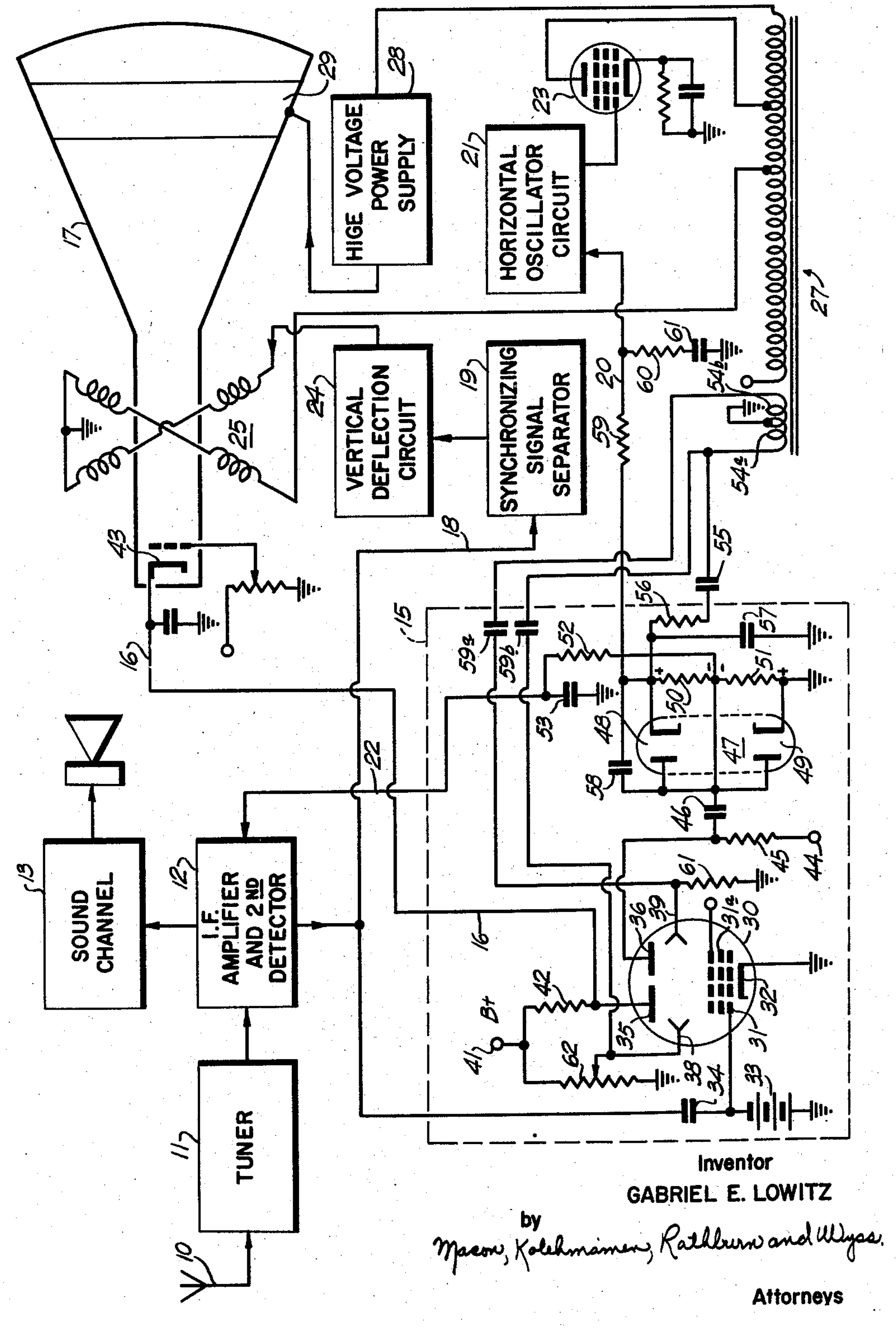
Inventor
GABRIEL E. LOWITZ
by
Mason, Kolehmainen, Rathburn and Wyss.
Attorneys United States Patent Office 2,925,466

Patented Feb. 16, 1960

2,925,466

TELEVISION RECEIVER

Gabriel E. Lowitz, Snyder, N.Y., assignor, by mesne assignments, to Sylvania Electric Products Inc., Wilmington, Del., a corporation of Delaware Application March 29, 1956, Serial No. 574,802

5 Claims. (Cl. 178—7.5)

The present invention relates to television receiver circuits, and, more particularly, to a combined gated AFC and keyed AGC circuit which is of general utility in monochrome and color television receivers. Because these circuits have no connection with the color functions of a television receiver, for purposes of clarity the present invention is described in connection with a monochrome television receiver.

It has been the usual practice in present-day television receiver design to utilize separate discharge devices for amplifying the detected video signal before application thereof to the picture tube, for amplifying the synchronizing pulses before application thereof to a synchronizing pulse separator circuit, and for providing an amplified AGC signal for controlling the gain of the video IF channel. Moreover, those receivers which utilize keyed AGC and gated AFC for the purpose of providing high quality reproduction of a televised image may employ additional discharge devices for carrying out these keying functions.

Therefore, a principal object of the present invention is to provide a television receiver employing a simplified circuit arrangement for amplifying and separating the video signal and the synchronizing pulses, for providing an amplified keyed AGC signal and for providing a gated AFC control signal suitable for controlling the horizontal oscillator of the receiver.

A further object of the present invention is to provide a new and improved amplifier circuit for improving the operation of the television receiver while reducing the manufacturing cost thereof.

A still further object of this invention is to provide a combined gated AGC and AFC circuit which employs common circuit elements for providing an amplified keyed AGC voltage and a gated AFC control voltage.

Briefly, the above and further objects are realized in accordance with the present invention by providing a combined video, AFC and keyed AGC amplifier circuit which includes a discharge device of the so-called gated beam type having a single signal input grid and a pair of output anodes which may be selectively rendered conductive by means of a gating signal supplied to deflection rods adjacent the anodes. A gating signal derived from the horizontal deflection circuit is employed to render one of the anodes conductive during reception of the video portion of the television signal and renders the other anode conductive during the retrace interval when the synchronizing pulses are present in the television signal. The synchronizing signal is connected to a conventional synchronizing signal separator circuit and is also connected to a phase discriminator circuit which is arranged to develop a keyed AGC signal and a control signal suitable for controlling the frequency of the horizontal oscillator to maintain the same in synchronism with the received television signal.

The invention both as to its organization and method of operation, together with further objects and advantages thereof will best be understood by reference to the following detailed description taken in connection with the accompanying drawing in which the single figure is a circuit diagram of a monochrome television receiver embodying certain aspects of the present invention.

Referring now to the drawing, the present invention is therein illustrated in conjunction with a monochromatic television receiver which includes a receiving antenna 10 which is connected to a tuner 11. The intermediate frequency video signal from the tuner 11 is further amplified and detected in the IF amplifier and second detector circuit 12 from which the audio modulated carrier wave is supplied to a conventional sound channel 13. The detected composite television signal from intermediate amplifier and second detector 12 is supplied to the combined video amplifier, gated AFC and keyed AGC amplifier circuit 15 of the present invention. From the circuit 15 an amplified video signal is supplied over the conductor 16 to the cathode 43 of a conventional cathode ray picture tube 17, amplified synchronizing pulses are supplied, a control signal is supplied over the conductor 20 to the horizontal oscillator circuit 21 for synchronizing the phase and frequency of this oscillator, and a keyed AGC voltage is supplied over the conductor 22 to the IF amplifier and second detector 12 for controlling the gain thereof. A synchronizing signal separator 19 is supplied with the combined television signal from the detector 12 over the conductor 18 and provides an output of vertical synchronizing pulses of suitable amplitude for application to the vertical deflection circuits 24. The horizontal oscillator 21 supplies a horizontal deflection signal to a horizontal output tube 23 which drives the horizontal output transformer 27. Suitable horizontal and vertical scanning currents of saw tooth waveform are thereby supplied to the deflection yoke 25 and cause the electron beam in the picture tube 17 to trace a raster on the image screen thereof. In addition, the pulse output of the transformer 27 is applied to a high voltage power supply 28 and provides the high energizing voltage for the second anode 29 of the picture tube 17.

Considering now the portion of the receiver which embodies the features of the present invention, the circuit 15 comprises a multiple output discharge tube 30 having a signal or control grid 31 which is negatively biased with respect to the cathode 32 by means of a voltage provided from any suitable source 33 of unidirectional voltage. The detected video signal is coupled from the IF amplifier and second detector 12 through the condenser 34 to the control grid 31. The tube 30 additionally comprises a pair of anodes 35 and 36 which are adapted to be selectively rendered effective to collect the tube current in accordance with the polarity and magnitude of the voltage provided between a pair of deflecting rods 38 and 39. In the illustrated embodiment of the invention the voltage developed between the deflecting rods 38 and 39 is such that during the portion of the received television signal when the video or picture information is present, the tube current is collected by the anode 35 while during the portion of the television signal when the synchronizing pulses occur the anode 36 is rendered effective to collect the tube current. Accordingly, the video signal and the synchronizing pulses are separated in the tube 30, the video signal appearing at the anode 35 and the synchronizing pulses appearing at the anode 36.

As shown, the anode 35 is connected to a source of unidirectional voltage 41 through a load resistor 42 and the anode signal is coupled over a conductor 16 to the cathode 43 of the picture tube 17. Since the voltage level of the anode 35 rises to that of the B+ supply 41 during the retrace intervals, the electron beam in the picture tube 17 is cut off thereby to effect the necessary blanking of the picture tube 17 during the retrace interval. However, this blanking interval is derived from the horizontal oscillator 21 as will be described in more detail hereinafter.

The anode 36 is connected to a B+ terminal 44 through a load resistor 45 so that the signal at the anode 36 includes positive going synchronizing pulses. A portion of the positive going horizontal synchronizing pulses are differentiated and coupled through a capacitor 46 to a combined phase discriminator and AGC circuit 47 which supplies an AFC control signal over the conductor 20 to the horizontal oscillator circuit 21 and supplies an amplified and keyed AGC control voltage over the conductor 22 to the IF amplifier stages in the unit 12.

More fully, the phase discriminator circuit 47 comprises a pair of rectifiers 48 and 49 having the anodes thereof connected together and the cathodes thereof interconnected through a pair of series connected resistors 50 and 51. The junction of the resistors 50 and 51 is directly connected to the anodes of the diodes 48 and 49 so that positive synchronizing pulses transmitted through the capacitor 46 are clamped to ground potential by the diode 49 so that a pulse waveform having an average value which is negative with respect to ground is developed across the resistor 51. This pulse waveform is integrated in the series resistor 52 and the condenser 53 so as to provide an AGC voltage which is negative with respect to ground and can be applied to the control grids of the IF amplifier stages in the circuit 12. This AGC voltage has a magnitude proportional to the amplitude of the received horizontal synchronizing pulses which are supplied to the discriminator 47. Since the video signal is not present at the anode 36 substantial noise immunity is achieved and a keyed AGC action is obtained. Furthermore, there is considerable amplification of the synchronizing pulses in the tube 30 so that this keyed AGC voltage is of sufficient amplitude for direct application to the IF amplifiers in the unit 12. However, it will be noted that this keyed AGC signal is obtained without requiring additional diodes or amplifier tubes since the AFC diode 49 and the common amplifier tube 30 are employed. If a delayed AGC voltage is desired this can readily be obtained by simply biasing the cathode of the diode 49 positively by the desired amount instead of connecting this cathode to ground as shown. When the cathode of the diode 49 is biased positively it will not conduct until the synchronizing pulses have an amplitude which overcomes this bias and hence a delayed AGC action is obtained as will be readily understood by those skilled in the art.

In order to compare the phase relationship of the synchronizing pulses with that of the horizontal oscillator 21, a saw-tooth wave is derived from the horizontal output transformer 27. More particularly, the negative flyback pulses developed across the portion 54*a* of an auxiliary winding 54 on the transformer 27 are coupled through a blocking condenser 55 to an integration network including the series resistor 56 and the shunt condenser 57, the center tap of the winding 54 being connected to ground. Accordingly, a negative saw-tooth wave is developed across the condenser 57 which divides equally across the resistors 50 and 51, a condenser 58 being connected across the upper diode 48 to balance the effect of the capacitor 46. These oppositely polarized pulse waveforms are superimposed upon the above described saw-tooth waves which are developed across the resistors 50 and 51 so that the average value of the composite waveform developed across the resistors 50 and 51 varies in accordance with changes in the phase relationship of the horizontal oscillator 21 and the received horizontal synchronizing pulses. The composite pulse and saw-tooth waveform developed across the resistors 50 and 51 is integrated in the circuit which includes the series resistor 59 and the shunt resistor 60 and capacitor 61, the AFC control voltage developed across the resistor 60 and capacitor 61 being connected by way of the conductor 20 to the control electrode of the horizontal oscillator 21. In this connection it has been assumed that the oscillator 21 is a multivibrator or similar device which requires a negative control signal to increase the frequency thereof. However, it will be understood that the opposite polarity of control voltage may be obtained by simply employing the other half 54*b* of the winding 54.

Pulses of opposite polarity which are developed across the opposite halves of the winding 54 on the output transformer 27 are capacitively coupled through capacitors 59*a* and 59*b* to respective ones of the deflection rods 38 and 39 thereby to cause the tube current to be collected by the anode 36 during the retrace interval. As shown, the deflection rod 39 is connected to ground through a resistor 61 and the rod 38 is biased positively with respect to ground by means of the potentiometer 62 so that in the absence of A.C. control signals from the winding 54 the current in the tube 30 is directed to the anode 36.

The load resistor 45 connected to the anode 36 is preferably of relatively small value so that the coupling capacitor 46 is effectively grounded for A.C. through the resistor 45. If desired, a low Q tuned circuit may be substituted for the load resistor 45 and the fundamental frequency component of the horizontal synchronizing pulses selected by means of this tuned circuit. This sine wave component may thus be applied to the phase discriminator as described above to provide both AGC and AFC control signals. In this connection it will be noted that the anodes 35 and 36 are each returned to the B+ voltage each time the electron beam is switched to the other anode so that a switching pulse component is present in the waveforms developed at the anodes 35 and 36. This switching pulse component may be balanced out at either anode by introducing a pulse component of the same amplitude but of the opposite polarity in each anode circuit. These neutralizing or balancing pulse components may be conveniently derived from the winding 54 so that they correspond to the switching pulses impressed upon the rods 38 and 39, as will be readily understood by those skilled in the art.

In the event that the presence of the vertical synchronizing pulses at the anode 36 is undesirable, the separated vertical synchronizing pulses from the separator 19 may be applied in the form of negative gating pulses to the signal grid 31*a* to the tube 30. With such an arrangement the vertical synchronizing pulses are gated out of the signal which is supplied to the combined AGC and AFC circuit 47.

While the invention has been described in connection with particular embodiments thereof, it will be understood by those skilled in the art that many changes and modifications may be made without departing from the true spirit and scope of the invention, and accordingly, all such changes and modifications which fall within the true spirit and scope of this invention are intended to be covered in the appended claims.

What is claimed as new and is desired to be secured by Letters Patent of the United States is:

1. In a television receiver, means for converting received television waves to waves of intermediate frequency; means for amplifying said waves of intermediate frequency; a discharge device amplifier having a cathode, a control grid, a pair of deflecting electrodes and first and second anodes, said deflecting electrodes being adapted to deflect the electron stream, emanating from said cathode, from said first anode to said second anode; means feeding intermediate frequency waves from said amplifying means to the control grid of said amplifier; a cathode ray picture tube; means coupling said first anode to an electrode of said cathode ray tube to control the intensity of the beam of electrons within said cathode ray tube; an oscillator for generating waves of horizontal deflection frequency; means coupling said oscillator to said deflection electrodes of said amplifier causing the stream of electrodes of said amplifier to impinge upon said first anode during horizontal trace periods of the received television waves, and, to cause the stream of electrons of said amplifier to impinge upon said second anode during horizontal retrace periods; a rectifying system; means feeding received amplified synchronizing pulses from said second anode to said rectifying system, means feeding pulses of horizontal deflection frequency from said oscillator to said rectifying system, said rectifying system producing a gain controlling voltage derived from and dependent upon the electrical pulses fed to it; and, means for applying to the means for amplifying said intermediate frequency waves, said gain controlling voltage.

2. In a television receiver, means for converting received television waves to waves of intermediate frequency; means for amplifying said waves of intermediate frequency; a discharge device amplifier having a cathode, a control grid, a pair of deflecting electrodes and first and second anodes, said deflecting electrodes being adapted to deflect the electron stream emanating from said cathode from said first anode to said second anode; means feeding intermediate frequency waves from said amplifying means to the control grid of said amplifier; a cathode ray picture tube having an electron emitting cathode; means coupling said first anode to the cathode of said cathode ray tube to control the intensity of the beam of electrons emitted by the cathode of said cathode ray tube; an oscillator for generating waves of horizontal deflection frequency; means coupling said oscillator to said deflection electrodes of said amplifier causing the stream of electrons of said amplifier to impinge upon said first anode during horizontal trace periods of the received television waves and to cause the stream of electrodes of said amplifier to impinge upon said second anode during horizontal retrace periods; a balanced rectifying system having a pair of anode electrodes and a pair of cathode electrodes; means feeding received amplified synchronizing pulses from said second anode to a pair of electrodes of said rectifying system, means feeding pulses of horizontal deflection frequency from said oscillator to the other pair of electrodes of said rectifying system, said rectifying system producing a gain controlling voltage in response to and dependent upon the pulses fed to it and means for subjecting said intermediate frequency amplifying means to said gain controlling voltage.

3. In a television receiver, means for converting received television waves to waves of intermediate frequency; means for amplifying the waves of intermediate frequency; a discharge device amplifier having a cathode, a control grid, a pair of deflecting electrodes and first and second anodes, said deflecting electrodes being adapted to deflect the electron stream emanating from said cathode from said first anode to said second anode; means feeding intermediate frequency waves from said amplifying means to the control grid of said amplifier; a cathode ray picture tube having a plurality of electrodes, means coupling said first anode to an electrode of said cathode ray tube to control the intensity of the beam of electrons within said cathode ray tube; an oscillator for generating waves of horizontal deflection frequency; means including a transformer coupling said oscillator to said deflection electrodes of said amplifier causing the stream of electrons of said amplifier to impinge upon said first anode during horizontal trace periods of the received television waves and to cause the stream of electrons of said amplifier to impinge upon said second anode during horizontal retrace periods of the received waves; a double diode rectifying system; means feeding received amplified synchronizing pulses from said second anode to one pair of like electrodes of said rectifying system, means feeding pulses of horizontal deflection frequency from said oscillator to the other pair of like electrodes of said rectifying system, said rectifying system producing a gain controlling voltage in response to pulses fed thereto; and, means for feeding to said intermediate frequency amplifying means, said gain controlling voltage developed by said double diode rectifying system.

4. In a television receiver, means for converting received television waves to waves of intermediate frequency; means for amplifying said waves of intermediate frequency; a discharge device amplifier having a cathode, a control grid, a pair of deflecting electrodes and first and second anodes, said deflecting electrodes being adapted to deflect the electron stream emanating from said cathode from said first anode to said second anode; means feeding intermediate frequency waves from said amplifying means to the control grid of said amplifier; a cathode ray picture tube, said tube having an electron emitting cathode; means coupling said first anode to the electron emitting cathode of said cathode ray tube to control the intensity of the beam of electrons within said cathode ray tube; an oscillator for generating waves of horizontal deflection frequency; means including a transformer coupling said oscillator to said deflection electrodes of said amplifier causing the stream of electrons of said amplifier to impinge upon said first anode during horizontal trace periods of the received television waves and to cause the stream of electrons of said amplifier to impinge upon said second anode during horizontal retrace periods of the received television waves; a double diode rectifying system having a pair of anodes and a pair of cathodes; means feeding received amplified synchronizing pulses from said second anode in parallel to the anodes of said rectifying system; means feeding pulses of horizontal deflection frequency from said oscillator in series to the cathodes of said rectifying system, said rectifying system producing a gain and frequency controlling voltages in response to pulses fed thereto and means for feeding the gain controlling voltage to said intermediate frequency amplifying means to control the output level thereof; and, means feeding the frequency controlling voltage to said oscillator to control the frequency of operation thereof.

5. In a television receiver, means for converting received television waves to waves of intermediate frequency; means for amplifying the waves of intermediate frequency; a discharge device amplifier having a cathode, a control grid, a pair of deflecting electrodes and first and second anodes, said deflecting electrodes being adapted to deflect the electron stream emanating from said cathode, from said first anode to said second anode; means feeding intermediate frequency waves from said amplifying means to the control grid of said amplifier; a cathode ray picture tube having a control electrode; means coupling said first anode to said control electrode of said cathode ray tube to control the intensity of the beam of electrons within said cathode ray tube; an oscillator for generating waves of horizontal deflection frequency; means coupling said oscillator to said deflection electrodes of said amplifier causing the stream of electrons of said amplifier to impinge upon said first anode during horizontal trace periods of the received television waves and to cause said stream of electrons of said amplifier to impinge upon said second anode during horizontal retrace periods of the received television waves; a rectifying system; means feeding received amplified synchronizing pulses from said second anode to said rectifying system, means feeding pulses of horizontal deflection frequency from said oscillator to said rectifying system, said rectifying system producing frequency and gain controlling voltages, means for controlling the output of said intermediate frequency amplifying means with said gain controlling voltage; and means for controlling the frequency of operation of said oscillator with said frequency controlling voltage.

References Cited in the file of this patent

UNITED STATES PATENTS

| | | |
|---|---|---|
| 2,332,681 | Wendt | Oct. 26, 1943 |
| 2,458,156 | Fredendall | Jan. 4, 1949 |
| 2,708,689 | Vonderschmitt | May 17, 1955 |
| 2,754,363 | Nelson | July 10, 1956 |
| 2,811,581 | Spracklen | Oct. 29, 1957 |